(12) United States Patent
Hatfull

(10) Patent No.: US 7,017,940 B2
(45) Date of Patent: Mar. 28, 2006

(54) BOARD CARRIER

(76) Inventor: Mark Hatfull, 8 Wunnunga Crescent, Coolum, Queensland 4573 (AU)

( * ) Notice: Subject to any disclaimer, the term of this patent is extended or adjusted under 35 U.S.C. 154(b) by 68 days.

(21) Appl. No.: 10/502,852

(22) PCT Filed: Feb. 5, 2002

(86) PCT No.: PCT/AU03/00112

§ 371 (c)(1),
(2), (4) Date: Jan. 13, 2005

(87) PCT Pub. No.: WO03/066409

PCT Pub. Date: Aug. 14, 2003

(65) Prior Publication Data

US 2005/0116445 A1     Jun. 2, 2005

(51) Int. Cl.
*B62B 1/00* (2006.01)

(52) U.S. Cl. ............... 280/652; 280/63; 280/79.7; 280/79.3; 280/656

(58) Field of Classification Search ......... 280/47.131, 280/79.71, 47.2, 47.28, 47.35; 414/446, 414/490

See application file for complete search history.

(56) References Cited

U.S. PATENT DOCUMENTS

| | | | |
|---|---|---|---|
| 3,913,762 A * | 10/1975 | Alexander | 414/490 |
| 4,050,671 A | 9/1977 | Coleman | |
| 5,244,221 A | 9/1993 | Ward | |
| 5,375,277 A * | 12/1994 | Carr et al. | 5/625 |
| 5,857,695 A | 1/1999 | Crowell | |
| D424,266 S * | 5/2000 | McIntyre | D34/24 |

FOREIGN PATENT DOCUMENTS

| | | |
|---|---|---|
| CA | 2258380 | 7/1999 |
| CH | 670605 | 6/1989 |
| FR | 2735741 | 12/1996 |

\* cited by examiner

*Primary Examiner*—Bryan Fischmann
*Assistant Examiner*—Cynthia F. Collado
(74) *Attorney, Agent, or Firm*—Stites & Harbison, PLLC; David W. Nagle, Jr.

(57) ABSTRACT

A board carrier (100) comprising a holder (300, 400) for holding a plurality of boards; a body (200) mounting said holder (300, 400); a plurality of wheels (500) attached to the body (200) for contact with a ground surface; and a handle (600) associated with the body (200) to move said carrier (100); wherein the body (200) is formed from at least two sections (210, 220, 230), the sections (210, 220, 230) pivotally connected to each other.

14 Claims, 7 Drawing Sheets

BOARD CARRIER

FIELD OF THE INVENTION

THIS INVENTION relates to a board carrier. In particular, the invention relates to a board carrier that is able to carry a plurality of surfboards or the like and can be stored easily.

BACKGROUND OF THE INVENTION

The beach is a popular place of rest and recreation for many different groups of people including families. Due to the increasing popularity of surfing, many families have two or more family members that surf. Subsequently, when a family attends the beach, there are usually at least two boards that must be transported to the beach.

Most families travel to the beach using a motor vehicle that carries the boards. Once at the beach, the boards are normally taken from the vehicle and carried to the beach. A least one arm is required to carry a board, limiting the number of items that can be carried in a single trip to the beach from a vehicle. This causes a person to make multiple trips from the vehicle to the beach and back again to transport all of the necessary items.

Various types of carriers have been developed that may be suitable for carrying boards. For example, FR 2735741-A1, U.S. Pat. No. 5,244,221, CA 2258380 and CH 670 695 disclose handling trolleys that may be able to carry boards. However, these type of board carries are large and unable to be transported easily within a motor vehicle. Further, the handling trolleys are not conducive to operation on a beach.

OBJECT OF THE INVENTION

It is an object of the invention to overcome or alleviate one or more of the above disadvantages and/or provide the consumer with a useful or commercial choice.

SUMMARY OF THE INVENTION

Accordingly, in one form, although not necessarily the only or broadest form, the invention resides in a board carrier comprising:
 a holder for holding a plurality of boards;
 a body mounting said holder;
 a plurality of wheels attached to the body for contact with a ground surface; and
 a handle associated with the body to move said carrier;
 wherein the body is formed from at least two sections, the sections pivotally connected to each other.

It should be appreciated that the term "board" may incorporate surfboards, body boards or the like wave riding and/or floatation devices.

The board carrier may be foldable. Preferably, the board carrier can carry at least five boards. The board carrier may be constructed from rust resistant material.

The holder may include two racks. The respective racks may be positioned adjacent opposing ends of the body. The racks may be pivotally mounted to the body. Each rack may include a plurality of fingers that extend outwardly from the body. The width between adjacent fingers may be varied. Each rack may be located on different sections.

The body may include a storage area to hold items. Alternately, the body may include a seat or baby capsule.

Preferably there are three sections that are pivotally connected to each other.

Preferably, there are two wheels. The wheels may be removably attached to the body. Preferably, the wheels are attached to the body so that the board carrier can be pivoted easily with respect to the ground surface.

Preferably, the wheels are attached adjacent where sections of the body are pivotally connected.

The handle may be attached to the body. The handle may be pivotally attached to the body. The handle may be telescopic to lengthen and/or shorten the handle as is required.

Alternatively, the handle may form part of the body.

BRIEF DESCRIPTION OF THE DRAWINGS

An embodiment of the invention will be described with reference to the accompany drawings in which.

DETAILED DESCRIPTION OF THE PREFERRED EMBODIMENT

Figure 1:
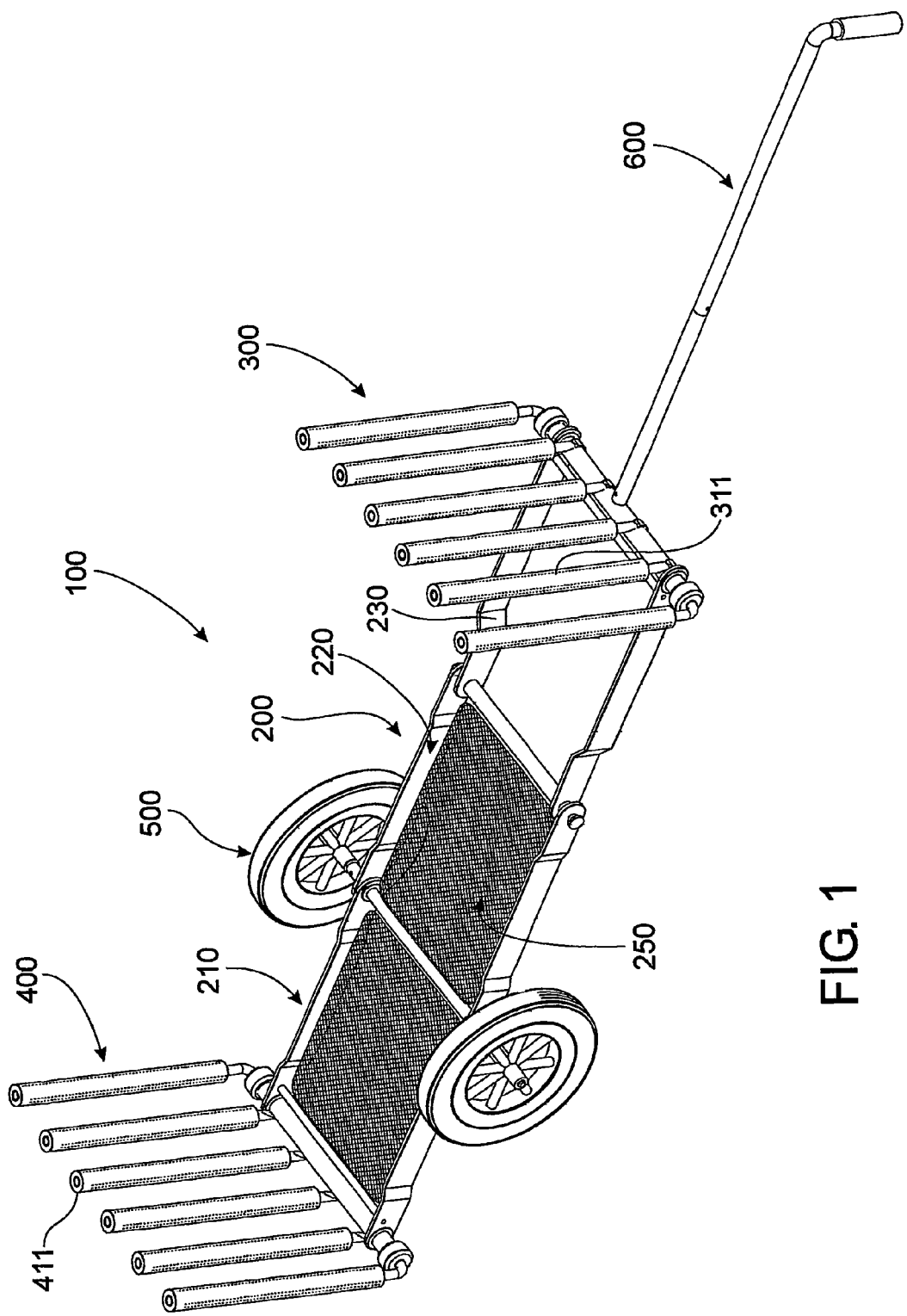
FIG. 1 is a perspective view of a board carrier according to an embodiment of the invention.
Figure 2:
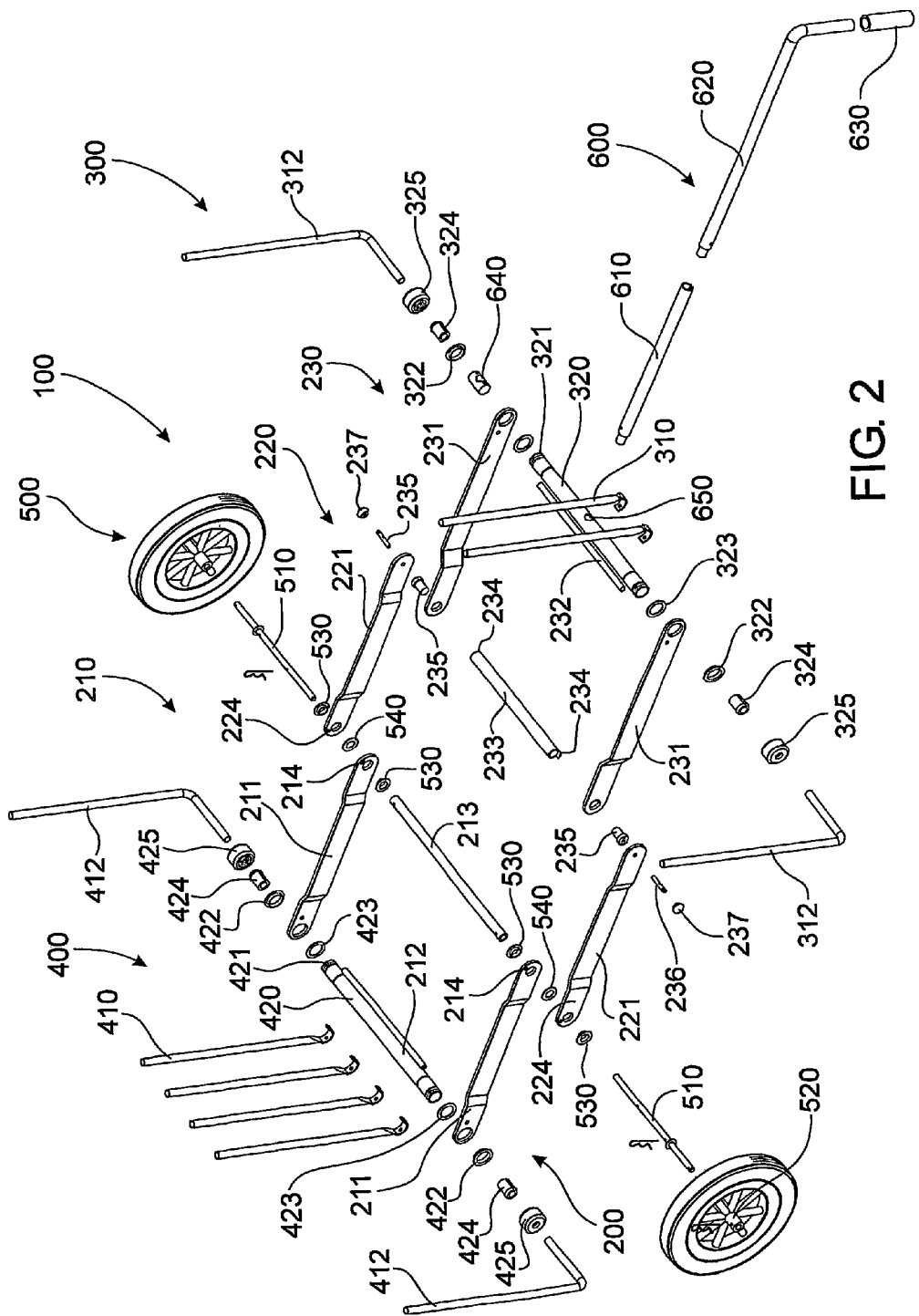
FIG. 2 is an exploded view of the board carrier of FIG. 1.
Figure 3:
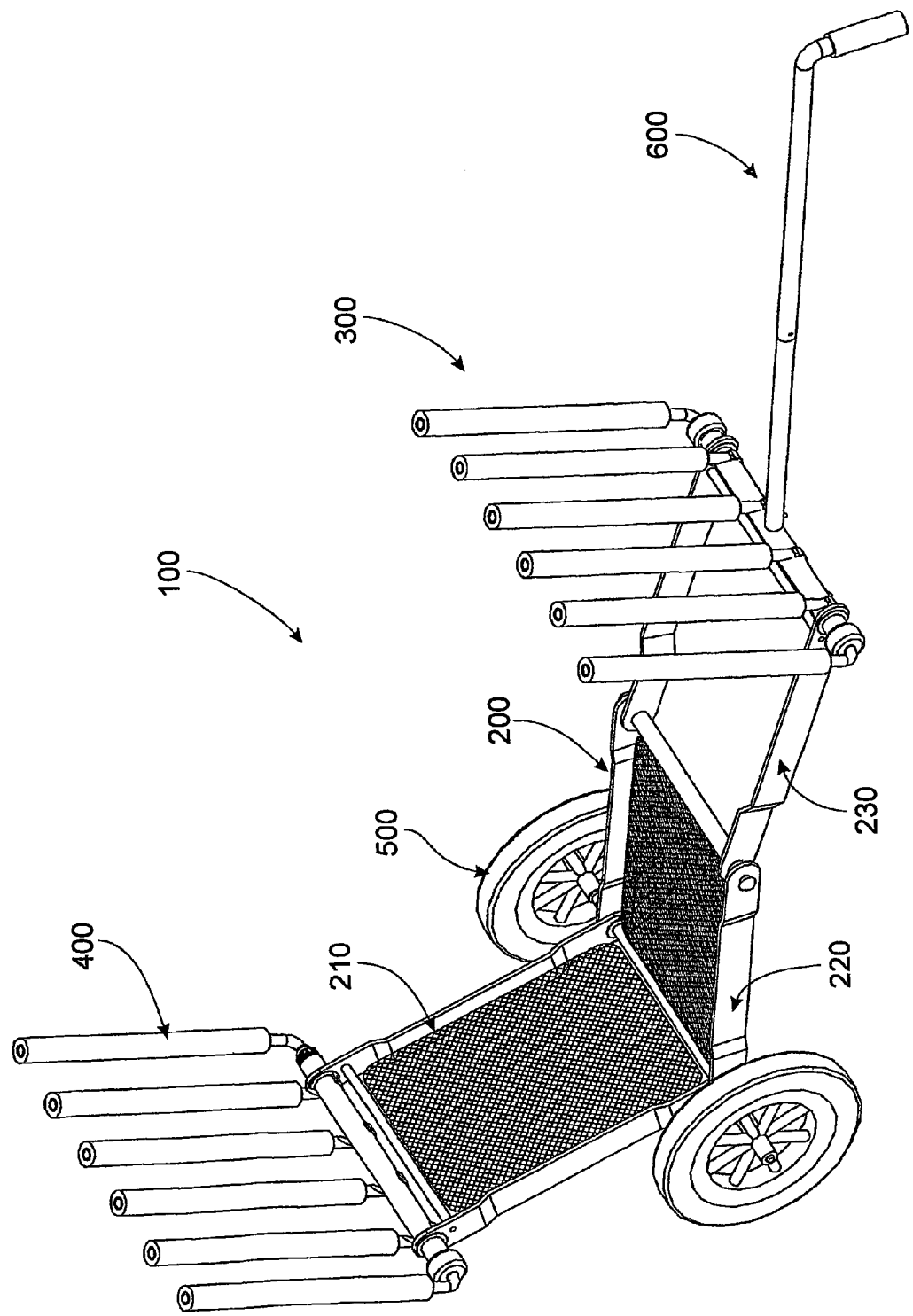
FIG. 3 is a further perspective view of the board carrier of FIG. 1.

Referring to FIG. 1 to 3, a board carrier 100 is shown having a body 200, a forward rack 300, a rear rack 400, two wheels 500 and a handle 600.

The body 200 includes a rear section 210, a forward section 220 and an extension section 230. The rear section 210 is pivotally mounted to the forward section 220 and the forward section 220 is pivotally mounted to the extension section 230.

The rear section 210 is formed from two rear side frames 211 that are spaced apart by a rear spacer 212. The front section 220 is formed from two front side frames 221. The extension section 230 is formed from two side extension frames 231 that are spaced apart by an extension spacer 232.

A central shaft 213 spaces and allows the front section 210 to pivot relative the rear section 220. Holes 214 and 224 located in respective front and rear frames 211 and 221 are used to locate a locking pin (not shown) through the frames 211 and 221 to lock the frames 211 and 221 together.

The central shaft 213 is also used to attach the wheels 500 to the carrier 100. The wheels 500 are mounted to axles 510 that are mounted to the central shaft 213. The axles 510 are attached to the wheels 500 using retaining pins 520. The axles 510 are located through the frames 211 and 221 using centre spacer 530 and centre bushes 540. The axles 510 are also located within the centre shaft 213 and mounted to the centre shaft 213 using clips (not shown).

The wheels 500 are normally golf buggy wheels and can be constructed from rigid material, such as rubber, or may be inflatable tyres An extension shaft 233 spaces and allows the front section 210 to pivot relative the extension section 230. Extension shaft stops 234 forms ends of the extension shaft 233. The extension shaft 233 is mounted to the front frames 221 and extension frames 231 using locking bushes 235, locking bush pins 236, and release buttons 237. The locking bushes 235 are located through the extension frames 231 and fixed to the end of the extension shaft 234. The locking pins 236 are connected to the release buttons 237 and are placed through the side frames 221 and fixed to the locking bushes 235.

The extension shaft stops 234 prevent the front side frames 221 and extension side frames 233 rotating past each other as both frames 221 and 231 engage the extension shaft stops 234.

Webbing 250 extends over the rear section 210 and forward section 220 to form a seat. The seat can be used to accommodate a small child or carry beach items, such as wetsuits, bags, towels and the like. Alternatively, a baby capsule may be attached to and located between the rear section 210 and forward section 220.

The forward rack 300 is located adjacent the end of the extension section 230 whilst the rear rack 400 is located adjacent an end of the rear section 210. Each rack 300 and 400 is formed from a number of fingers 310 and 410 that extend from a transverse bar 320 and 420. The fingers 310 and 410 of each rack 300 and 400 are substantially parallel to one another. A foam sleeve 311 and 411 is located around each of the fingers to prevent the boards from being damaged. Two outer fingers 312 and 412 are also form part of the racks 300 and 400.

The transverse bars 320 and 420 have threaded ends 321 and 421 respectively. The threaded ends 321 and 421 are passed through respective frames 231 and 211. Bushes 322 and 422 and washers 323 and 423 are located adjacent respective threaded ends 321 and 421. Split clamps 324 and 424 are located within the locking nuts 325 and 425. Ends of outer fingers 312 and 412 are located through the locking nuts 325 and 425 and split clamps 324 and 424. By screwing the locking nuts 325 and 425 onto the threaded ends 321 and 421, this causes the split clamps 324 and 424 to hold the outer fingers 312 and 412 in position. Further, the locking nuts 325 and 425 also hold the transverse bars 320 and 420 relative to the frames 231 and 211.

The handle 600 comprises a handle grip 630, a handle shaft 620 and an handle extension shaft 610. The handle extension shaft 610, handle shaft 620 and handle extension shaft 610 are attached using suitable fasteners (not shown). The end of the extension shaft 630 is threaded and fits into a handle nut 640 that is located with the transverse bar 320. A hole 650 allows the handle extension shaft 610 to be passed through the transverse bar 320 to screw the handle extension shaft 610 onto the handle nut 640.

The central shaft 213 is located so that when boards (not shown) are placed on the board carrier 100, minimal force is required to push the handle 600 downwardly to enable the board carrier 100 to be moved via the wheels 500.

The board carrier 100 shown in this embodiment can carry up to five boards 100. However, it should be appreciated that the number of fingers 310 and 410 can be varied to carry more or less boards, as is required.

FIG. 3 shows the board carrier 100 where the rack 400 has been adjusted to a different angle with respect to the rear section 210. The rear section 210 has also been adjusted by locating the locking pin in a different hole 214 on the rear frame 211.

Referring to FIGS. 4A to 4D, the board carrier 100 can be folded so that it can be packed into a bag or located within a vehicle without occupying a substantial amount of space.

Figure 4A:
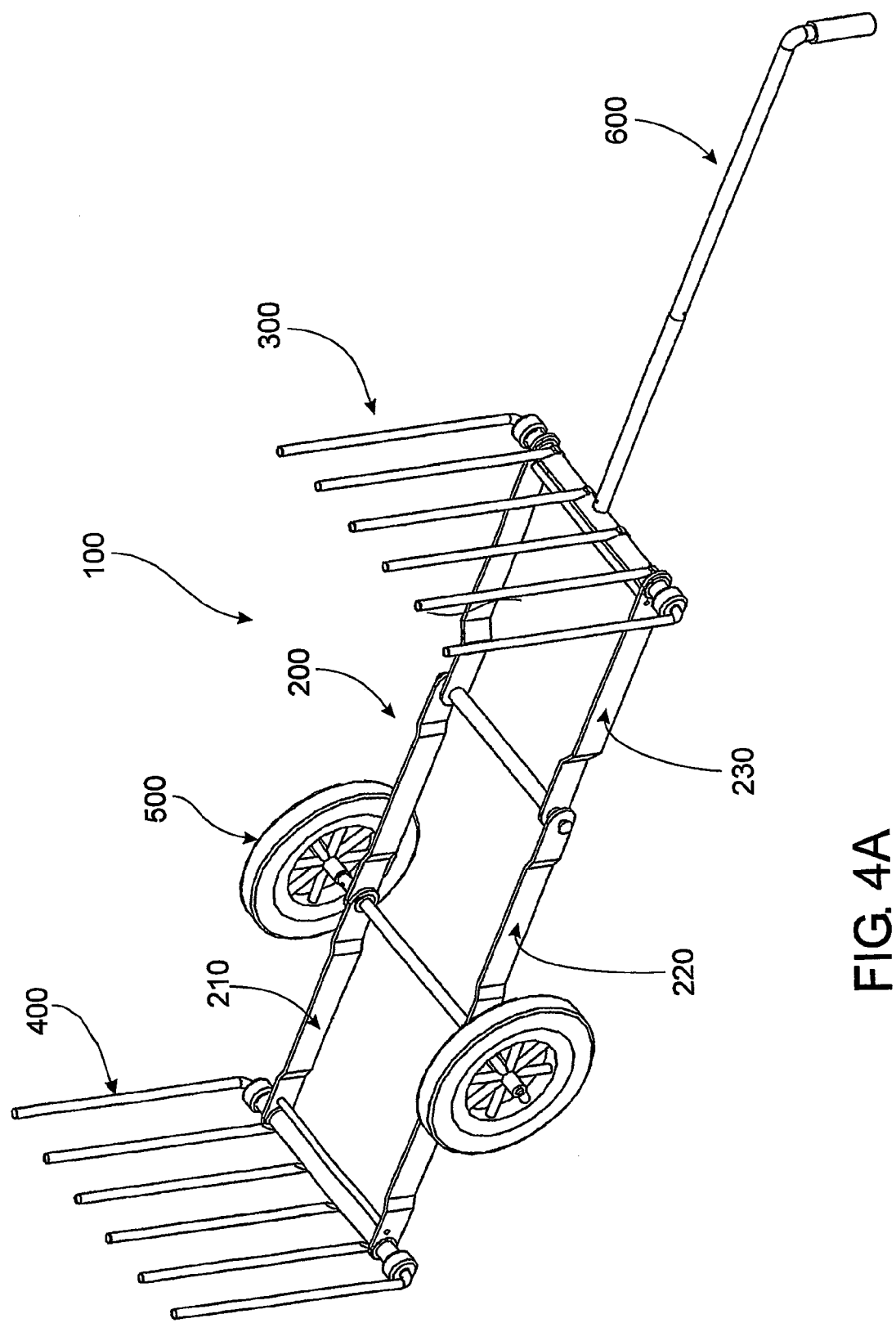
FIG. 4A is a side view of the board carrier in an extended position.
Figure 4B:
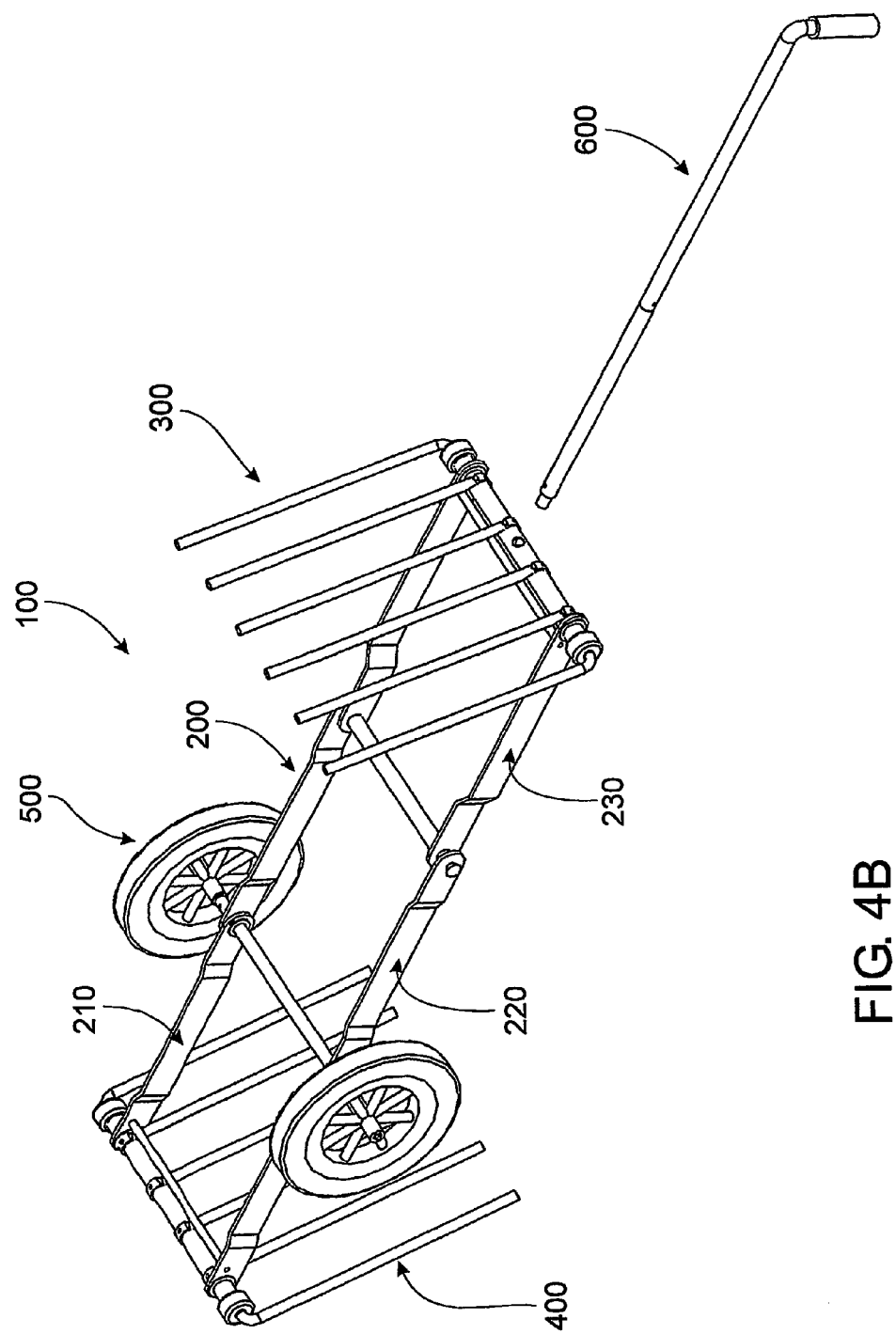
FIG. 4B is a side view of the board carrier in a semi-folded position.
Figure 4C:
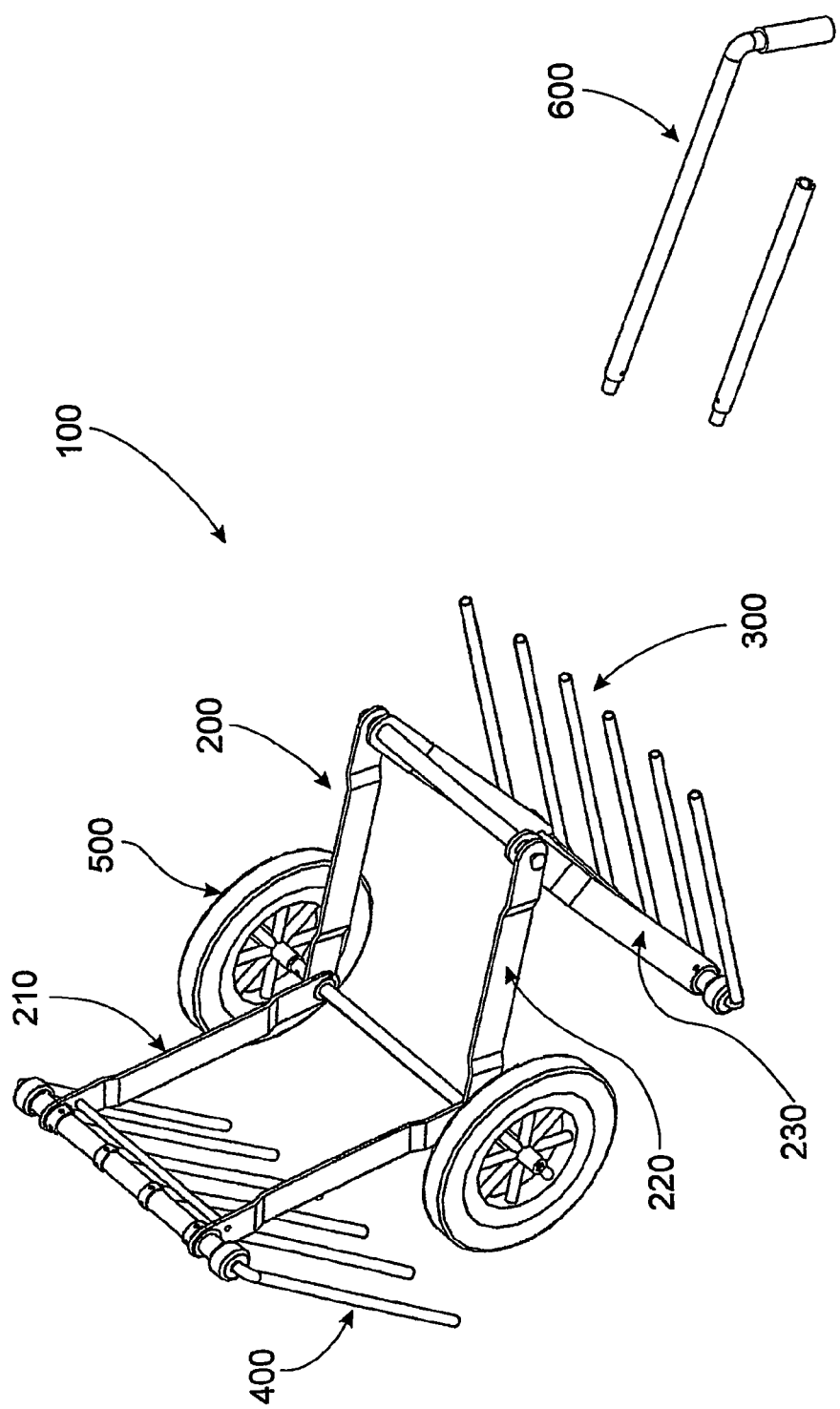
FIG. 4C is a side view of the board carrier in a further semi-folded.
Figure 4D:
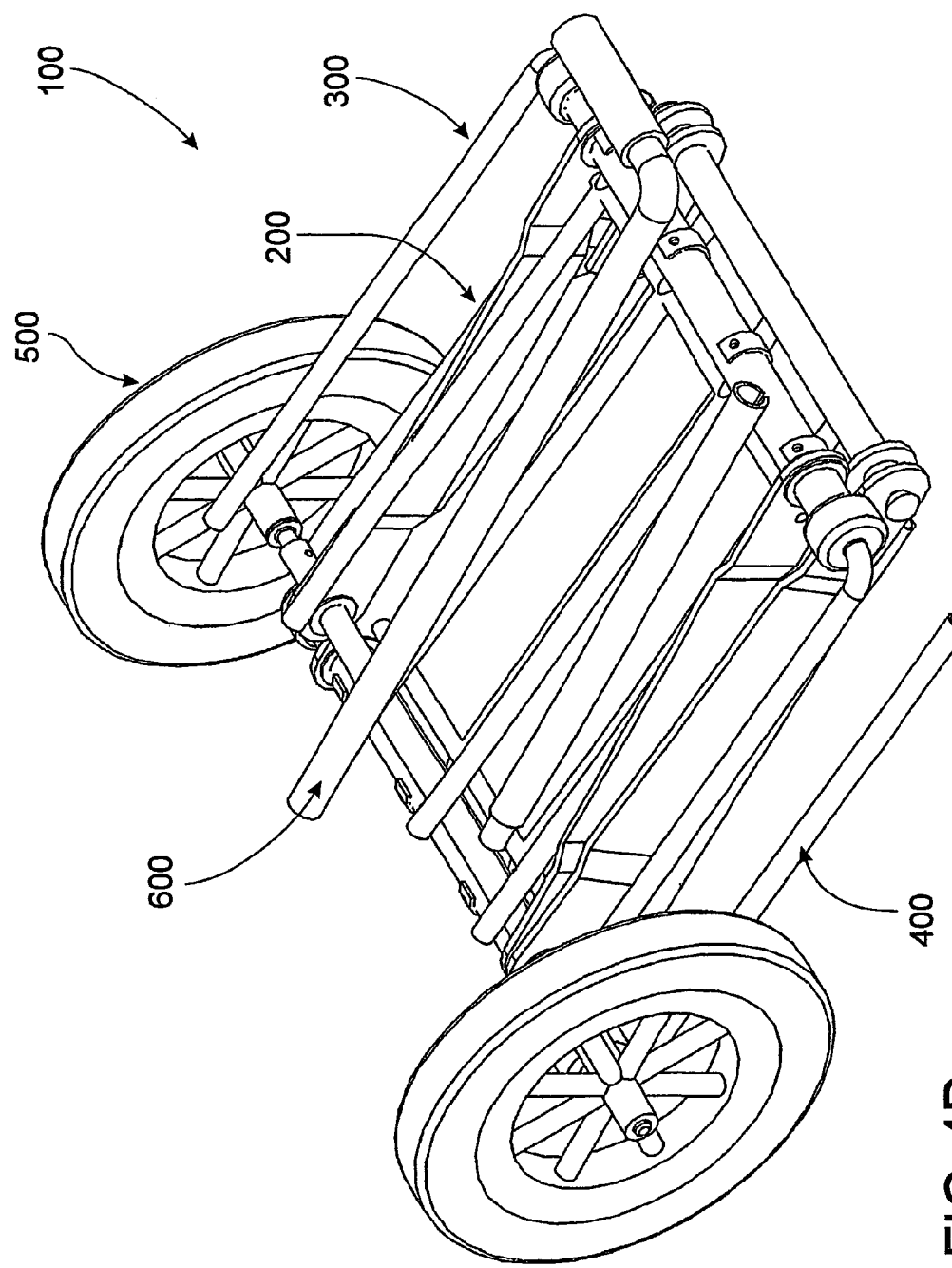
FIG. 4D is a side view of the board carrier in a folded position.

The board carrier 100 is folded from an extended position shown in FIG. 4A to a folded position shown in FIG. 4D. This board carries is folded by unscrewing the handle extension shaft 610 from the handle nut 640 to remove the handle 600 from the transverse bar 320. The handle shaft 620 and handle extension shaft 610 can then be separated from each other.

The locking nuts 325 and 425 can be partially unscrewed from the transverse bars 320 and 420 to allow the transverse bars 320 and 420 to be rotated relative to extension section 230 and the rear section 210. The locking pins are removed from the rear side frames 211 and front side frames 221 to allow the rear side frames 211 and the front side frames 221 to pivot with respect to each other.

The rear section 210, front section 220, extension section 230, front rack 300 and rear rack 400 are now able to pivot so that they are able to collapse on each other as shown in FIG. 4D. If desired, the wheels 500 can be removed by releasing the retaining pins.

The board carrier 10 can be easily located within a bag of commensurate size or located within a vehicle. The board carrier enables multiple boards and beach items to be carried easily to the beach. It eliminates the need for multiple trips to be conducted and can be operated by a single hand.

It should be appreciated that the board carrier 100 may be modified so that it may be attached to a bicycle so that it may be towed.

It should be appreciated that various other changes and modifications may be made to the embodiment described without departing from the spirit or scope of the invention.

What is claimed is:

1. A board carrier comprising:
   a holder, including two racks, for holding a plurality of boards;
   a body mounting said holder, the body being formed from at least two sections, the sections pivotally connected to each other;
   a plurality of wheels attached to the body for contact with a ground surface; and
   a handle associated with the body to move said carrier;
   wherein each rack includes a plurality of fingers that extend outwardly from the body.

2. The board carrier of claim 1 wherein the respective racks are positioned adjacent opposing ends of the body.

3. The board carrier of claim 2 wherein the racks are pivotally mounted to the body.

4. The board carrier of claim 1 wherein the width between adjacent fingers is variable.

5. The board carrier of claim 1 wherein each rack is located on different sections.

6. The board carrier of claim 1 wherein the body includes a storage area.

7. The board carrier of claim 1 wherein the body includes a seat or baby capsule.

8. The board carrier of claim 1 wherein there are three sections that are pivotally connected to each other.

9. The board carrier of claim 1 wherein the wheels are removably attached to the body.

10. The board carrier of claim 1 wherein the wheels are attached adjacent where sections of the body are pivotally connected.

11. The board carrier of claim 1 wherein the handle is attached to the body.

12. The board carrier of claim 1 wherein the handle is pivotally attached to the body.

13. The board carrier of claim 1 wherein the handle is telescopic.

14. The board carrier of claim 1 wherein the board carrier the board carrier may be constructed from rust resistant material.

* * * * *

UNITED STATES PATENT AND TRADEMARK OFFICE
CERTIFICATE OF CORRECTION

| | |
|---|---|
| PATENT NO. | : 7,017,940 B2 |
| APPLICATION NO. | : 10/502852 |
| DATED | : March 28, 2006 |
| INVENTOR(S) | : Mark Hatfull |

It is certified that error appears in the above-identified patent and that said Letters Patent is hereby corrected as shown below:

On the Title Page:

Item (22) Change PCT filing date to read: Feb. 5, 2003

Add Item (30) Foreign Application Priority Data to show the following:

(30) Foreign Application Priority Data
    Feb. 5, 2002  (AU)………………….. AU2002PS00315

Signed and Sealed this

Fifth Day of September, 2006

JON W. DUDAS
*Director of the United States Patent and Trademark Office*